Sept. 7, 1937.  O. K. KELLEY  2,092,580
GEAR SHIFT DAMPER
Filed Nov. 16, 1935  2 Sheets-Sheet 1

Inventor
Oliver K. Kelley
By Blackmore, Spooner & Flint
Attorneys

Patented Sept. 7, 1937

2,092,580

UNITED STATES PATENT OFFICE 2,092,580

GEAR SHIFT DAMPER

Oliver K. Kelley, Pontiac, Mich., assignor, by mesne assignments, to Yellow Truck and Coach Manufacturing Company, Pontiac, Mich., a corporation of Maine Application November 16, 1935, Serial No. 50,149

7 Claims. (Cl. 192—37)

This invention relates to power operated systems for shifting change speed gearing of motor vehicles and the like. It concerns particularly transmissions of the synchromesh type and the movement of the parts into drive transmitting relation. Transmissions of this sort have synchronizing clutches associated with the toothed driving elements to be meshed and in the operation of engaging driving and driven elements the initial movement of the shifter device brings the frictional clutch into action to equalize relative speed and permit the coupling teeth to slide smoothly into mesh during the continuing and final movement of the shifter device.

In passenger coach or bus installations wherein the power plant is located at the rear of the vehicle or otherwise removed from the forward station of the operator, attempts have been made to shift gears by a power system wherein air under pressure is fed under control of a master valve within convenient reach of the operator to one or more pressure responsive devices operatively connected with the shifter mechanism in the gear box. Satisfactory results have not been had because with the initial action of the pressure responsive device the synchronizing friction clutch engages and this increases resistance to further movement of the shifter mechanism whereby pressure builds up in the pressure responsive device to an extent that after synchronizing is complete the gear elements are clashed or brought together finally with unnecessarily great force and speed, which not only is likely to harm the parts but also produces objectionable noise.

In order to eliminate the difficulty mentioned it is here proposed to incorporate in a power shift system, preferably in association with the pressure responsive device, some means to compensate for pressure rise incident to the continuing flow of pressure fluid during the synchronization period and thereby insure smooth and quiet engagement, and particularly guard against sudden action after synchronization. The rate of response in the final movement may be considerably retarded as may be desired, but in any event a different rate for the initial and final movements of the shifter mechanism may be had by proper choice and control of resistance values in relation to selected air pressure.

Figure 1:
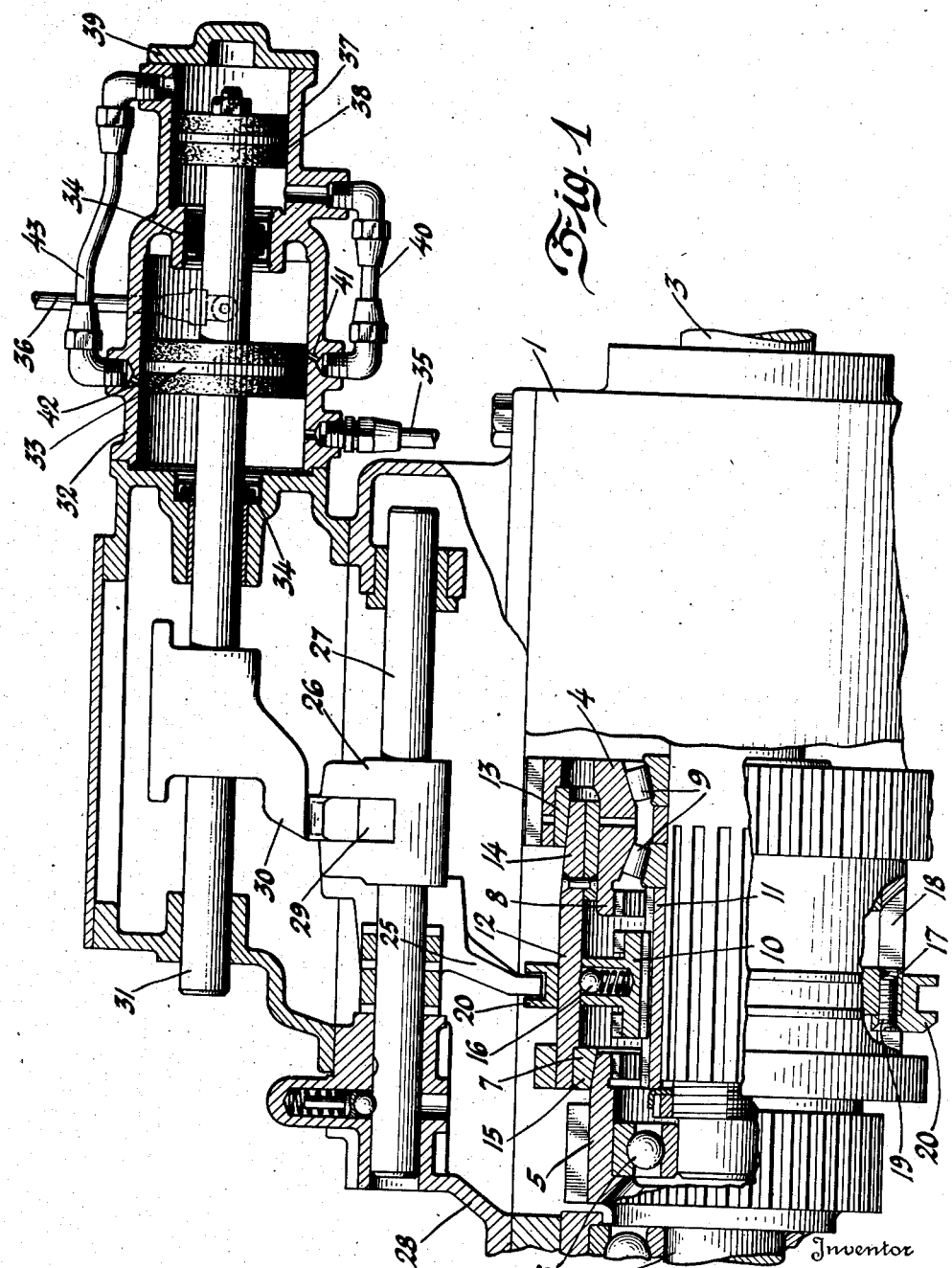
Figure 2:
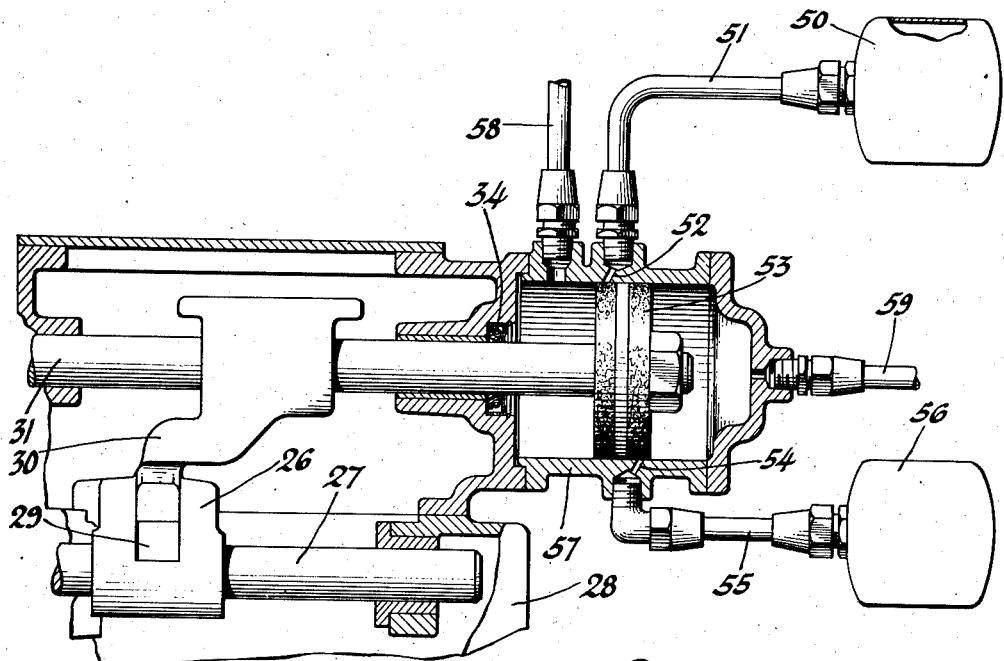
Figure 3:
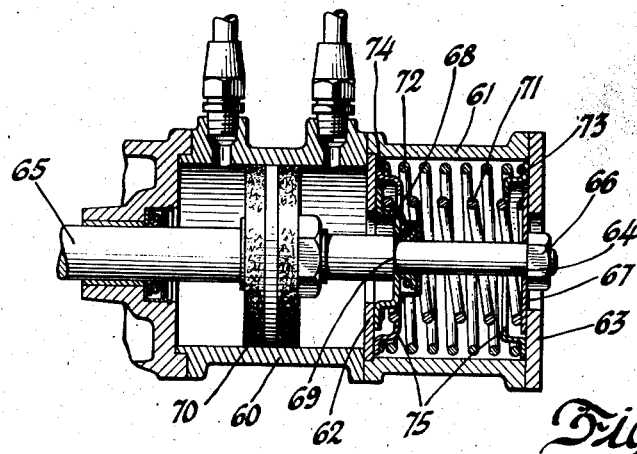

For a better understanding of the invention reference may be had to the accompanying drawings, wherein Figure 1 is a longitudinal sectional view showing a fragment of a change speed gear mechanism for motor vehicles with my improved shifter mechanism applied thereto, and Figures 2 and 3 are detail sectional views illustrating modifications.

Only so much of the complete power drive system is shown in the drawings as is necessary to illustrate the invention. The invention may be applied to any conventional change speed gearing with speed synchronizing devices, an example of which is contained in Tenney Patent No. 1,886,850.

In the drawings the numeral 1 indicates a gear box or housing into which project the input and output shafts 2 and 3, respectively. Adapted to be coupled individually with the output shaft 3 are the second speed and high or direct speed driving elements 4 and 5, respectively, and which form part of a constant mesh gear train, but the companion gears of the sets to be mounted on a countershaft are omitted in the drawings for the sake of simplicity. The gear 5 for driving the countershaft is mounted on the end of the drive shaft 2 and through an internal bearing 6 pilots the end of the output shaft 3. A cylindrical extension 7 of the gear 5 has internally thereof a series of coupling teeth and in axially spaced relation thereto are similar coupling teeth on a tubular extension 8 of the second speed gear 4 which is mounted for rotation by the bearings 9 on the output shaft. Between the two sets of coupling teeth is a slider collar 10 provided at opposite ends with clutch teeth adapted for individual engagement with the internal teeth on the extensions 7 and 8, respectively. This slider collar 10 is splined or keyed to a spacer sleeve 11 fixed on the output shaft for rotation in unison with the shaft. Thus movement of the collar 10 toward the left in Figure 1 clutches the input and output shafts in direct driving relation while movement of the slider toward the right couples the output shaft with the input shaft through the constant mesh gear train.

Inasmuch as the coupling under normal conditions is effected while the vehicle is in motion and the engine clutch disengaged, the speed of rotation of the output shaft and, therefore, the slider 10, will differ from that of either of the gear elements 4 and 5, and to insure an easy meshing of the teeth in the shifting operation the common practice is to first frictionally clutch the slider and the gear element to be engaged. To effect such synchronization of speed the slider 10 is provided with a sleeve 12 having conical clutch surfaces at opposite ends for frictional contact with the respective gear elements 4 and 5. The tapered driving surface on one end of the sleeve 12 is provided on the periphery thereof and a cooperating internal tapered surface is formed on a ring 13 carried by the gear element 4. A bearing ring 14 is riveted or otherwise secured interiorly of the sleeve for sliding engagement with the cylindrical extension 8. On the other end of the sleeve an internal ring 15 provides a friction clutch surface for engagement with the tapered peripheral surface on the extension 7 of the gear 5. One or more spring pressed poppets 16 serve to locate the sleeve 12 with reference to the slider 10 and the slider likewise is provided with a number of radial projections 17 which are movable through axially elongated slots 18 in the sleeve 12 and are connected by studs or pins 19 with a ring 20 surrounding the sleeve 12 and having an annular groove to receive a shifter fork. By means of synchronizing cones provided by the cooperating conical surfaces on the parts 7—15 and 13—12 the speed of the revolving parts is first equalized as a part of the initial movement of the shifting mechanism and then the gear clutch elements are coupled as a part of the final movement of the shift mechanism.

The fork 25 which engages the ring 20 has its head 26 fixed to a shift rail 27 which is mounted in suitable bearings in the cover 28 of the gear box. As is well understood, the usual gear box involves two or more shift rails, depending upon the number of gear trains involved and the heads of the several forks are each provided with slots as at 29 which in the neutral position of the parts are in transverse alinement with each other for the movement therethrough of a selector foot 30 mounted on a rockable and shiftable rail 31. When the rail 31 is rocked the selector arm 30 moves into engagement with one of the shift forks to slide the same in unison therewith upon the subsequent shifting movement of the rail 31. To rock the rail back and forth there may be provided as a part of the power shifter system a pressure responsive device, not shown, arranged as described in my pending application for patent Serial No. 34,339, filed August 2, 1935.

For shifting the rail 31 after a selection has been made, a pressure responsive device is provided in the form of a hollow cylinder 32 fastened on the end of the cover 28 and enclosing a slidable piston 33 mounted on the rail 31 and which rail extends through the cylinder 32 with suitable packings 34 in the opposite walls thereof. Air or other fluid under pressure is introduced into the cylinder 32 on one side of the piston through a conduit 35 and to the opposite side of the piston through a conduit 36 both leading from the source of supply and being under control of the operator by suitable valving. A secondary pressure cylinder 37 of smaller diameter than the main cylinder 32 encloses a piston 38 on the end of the shift rod 31. For convenience and economy of manufacture the two cylinders may be formed as a single casting in which event the end wall 39 of the cylinder 37 will be formed as a removable plate to facilitate assembly. The space within the two cylinders on adjacent sides of the two pistons are interconnected with each other as by means of an exterior conduit 40 and suitable pipe fittings which extend between apertured bosses integral with the cylinder casting. In the case of the boss associated with the main cylinder the communication is by means of a small diagonal passageway 41 which is closed by the piston 33 in its intermediate or neutral position. A similar port 42 arranged in axially spaced relation to the port 41 is intended to communicate through a conduit 43 the spaces within the two cylinders on the remote sides of the respective pistons, and this port is also closed by the piston 33 in the intermediate or neutral position of the parts.

Assuming the selector arm 30 to be engaged with the head 29 and the parts in the position illustrated in the drawings, the output shaft 3 may be coupled with the second speed gear upon the movement of the shifter rod 31 toward the right through the introduction of air under pressure through the conduit 35. The air under pressure acting against the piston 33 moves the piston a small amount until the synchronizing cones come into engagement. This movement is not enough to uncover port 42, and momentarily further movement is now resisted while synchronizing takes place, but in this momentary lag of the piston, pressure within the left end of cylinder 32 builds up to an appreciable degree. After synchronizing has been completed and the piston has resumed its motion the port 42 is immediately uncovered to relieve pressure by allowing air to flow into the secondary cylinder through the conduit 43. Thereafter the smaller piston acts in opposition to the larger piston and further movement is at a somewhat reduced rate inasmuch as the effective area acted on by the pressure is the difference in surface areas between the two pistons. The action is the same when a shift into third speed position is to be effected with the air under pressure supplied through the conduit 36 acting first on the large piston 33 and finally on the two pistons in opposition to each other whereby the coupling of the toothed clutching elements is effected smoothly after synchronization has been effected.

In lieu of a differential piston action satisfactory results may be had by substituting expansion chambers, one on each side of the piston, for the relief of pressure after synchronization has taken place. Such expansion chamber or chambers may be incorporated as a unit with the piston cylinder casting but for convenience of illustration Figure 2 shows separate expansion chamber units, one for each end of the piston cylinder. Thus the chamber 50 is connected by conduit 51 with a port 52 adapted to be closed by the piston 53 in the neutral and synchronizing positions of the parts, at which time there is also closed the axially spaced port 54 communicating through the line 55 with the expansion chamber 56. In this case, air under pressure introduced into the piston cylinder 57 through the pressure supply line 58 moves the piston toward the right to first synchronize speed and then complete the shift with the port 52 being uncovered after the synchronizing movement of the piston so that the pressure is relieved for the final movement. Likewise movement of the piston in the opposite direction under pressure of air supplied through the conduit 59 uncovers the port 54 after a predetermined extent of movement for communicating the expansion tank 56 with the piston cylinder.

Mechanical means for retarding the rate of movement may be constructed as shown in Figure 3. In this case the piston cylinder 60 has an extension 61 provided with end walls 62 and 63 and through which extension projects a reduced portion 64 of the piston rod 65. At its end the reduced shaft portion 64 carries a nut 66 or other suitable shoulder for engagement with a plate or washer 67 slidable on the shaft and a somewhat similar plate or washer 68 also slidable on the shaft is adapted to be seated on the shoulder 69 on the shaft 64. In the neutral position of the piston 70 the plate 67 is seated both on the nut 66 and the end wall 63 while the other plate 68 is also seated both on the shoulder 69 and the end wall 62. Between the two plates is interposed a coil spring 71 which offers resistance to piston movement in both directions inasmuch as the plates 67 and 68 are moved toward each other in either event. Also enclosed within the extension 61 is a larger spring 72 which seats at opposite ends against washers 73 and 74 adapted to bear against the end walls 62 and 63. Each washer is provided with an inwardly extending offset 75 arranged in spaced relation with the plates 67 and 68 so that after the synchronizing movement of the piston but before engagement of the drive gear clutches one or the other of the washers 73—74 will be picked up and further movement will be against the combined forces of the springs 71 and 72. Thus there will be eliminated the suddenness of final movement of the shifter mechanism in coupling the drive gear clutches.

I claim:

1. The combination with a pair of relatively movable drive transmitting members having speed synchronizing mechanism, means operative first to bring said synchronizing mechanism into action and then effect a drive relation of the members, of a fluid pressure device for operating said means, and cushioning means effective after the initial action of the fluid pressure device brings the synchronizing mechanism into action to slow down the speed of operation and provide for smooth driving engagement of the members.

2. In a power operated system for use with power transmitting means which is movable into and out of driving engagement and is provided with speed synchronizing mechanism, a member movable upon the application of power and through said mechanism to cause synchronization of speed of the power transmitting means to be engaged and then effect driving engagement thereof, and means effective after synchronizing movement of the member, to slow down the rate of final movement under the continued application of power.

3. For use with change speed gearing having synchronizing mechanism associated therewith, fluid pressure actuated gear changing means including a pair of pressure responsive devices coupled together for action in opposition, means effecting the application of fluid pressure to one of said devices and other means controlled by the response of the last mentioned device for diverting the application of fluid pressure therefrom to the other of said devices.

4. For use with change speed gearing having speed synchronizing mechanism associated therewith, fluid pressure actuated gear changing means including a fluid pressure responsive device, means to supply fluid under pressure thereto at a uniform rate and elastic motion resisting means of two stages cooperating with said pressure responsive device and being constructed and arranged to have one stage ineffective during the initial response of said device.

5. In combination with change speed gearing having speed synchronizing mechanism, of a fluid pressure gear changing system including a primary piston and cylinder, a secondary piston and cylinder having an effective surface area differing from that of the primary piston and cylinder, a connection between said pistons for their unisonal movement, means supplying fluid under pressure to the primary cylinder and a communicating conduit between said cylinders controlled by the position of the primary piston to open or close said conduit for the flow of fluid under pressure from the primary cylinder to the secondary cylinder for action on the secondary piston.

6. In combination with change speed gearing having speed synchronizing mechanism, of a fluid pressure gear changing system including a pair of differential size pistons arranged in tandem, pressure cylinders enclosing said pistons for movement in unison, means for introducing fluid under pressure to one of the cylinders to move the piston therein and means communicating said cylinders after a given movement of said piston for introducing fluid pressure into the other cylinder for action on the piston therein to retard the rate of piston travel.

7. In a construction of the character described, driving and driven elements adapted to be coupled, speed synchronizing mechanism therefor, a member movable to bring the synchronizing mechanism into action and then couple said driving and driven elements upon further movement, a fluid pressure responsive device including a pressure chamber connected with the member to move the same, an expansion chamber and means to connect the expansion chamber with the pressure responsive device whereby said expansion chamber will be placed in communication with said pressure chamber after the synchronizing mechanism comes into action for retarding the rate of movement in the coupling of said elements.

OLIVER K. KELLEY.